(12) United States Patent
Jaugilas et al.

(10) Patent No.: US 9,671,954 B1
(45) Date of Patent: Jun. 6, 2017

(54) TACTILE FEEDBACK DEVICES FOR CONFIGURABLE TOUCHSCREEN INTERFACES

(75) Inventors: John M. Jaugilas, Aurora, CO (US); Cindy Dorfmann, Darmstadt (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/179,920

(22) Filed: Jul. 11, 2011

(51) Int. Cl.
G06F 3/041 (2006.01)
G06F 3/0488 (2013.01)
G06F 3/044 (2006.01)

(52) U.S. Cl.
CPC ........ G06F 3/04886 (2013.01); G06F 3/0488 (2013.01); G06F 3/044 (2013.01); G06F 2203/04809 (2013.01)

(58) Field of Classification Search
CPC ............... G06F 3/04847; G06F 3/0488; G06F 2203/04809; G06F 3/048–3/04886; G06F 3/0416; G06F 3/0224
See application file for complete search history.

(56) References Cited

U.S. PATENT DOCUMENTS

| | | | | |
|---|---|---|---|---|
| 5,841,435 | A * | 11/1998 | Dauerer | G06F 3/0481 715/764 |
| 6,492,978 | B1 * | 12/2002 | Selig et al. | 345/173 |
| 7,015,894 | B2 * | 3/2006 | Morohoshi | 345/156 |
| 7,877,707 | B2 * | 1/2011 | Westerman et al. | 715/863 |
| 8,368,662 | B2 * | 2/2013 | Argiro | 345/173 |
| 8,553,001 | B2 * | 10/2013 | Krishnaswamy | 345/173 |
| 2002/0054030 | A1 * | 5/2002 | Murphy | 345/173 |
| 2003/0235452 | A1 * | 12/2003 | Kraus et al. | 400/472 |
| 2004/0056781 | A1 * | 3/2004 | Rix et al. | 341/20 |
| 2005/0154490 | A1 * | 7/2005 | Blaine et al. | 700/186 |
| 2006/0256090 | A1 * | 11/2006 | Huppi | 345/173 |
| 2007/0285278 | A1 * | 12/2007 | Forsstrom | G08C 17/00 340/870.28 |
| 2007/0300182 | A1 * | 12/2007 | Bilow | 715/799 |
| 2008/0042993 | A1 * | 2/2008 | Jaeger et al. | 345/173 |
| 2008/0192025 | A1 * | 8/2008 | Jaeger et al. | 345/173 |
| 2008/0303800 | A1 * | 12/2008 | Elwell | 345/173 |
| 2009/0100343 | A1 * | 4/2009 | Lee et al. | 715/733 |
| 2009/0151741 | A1 * | 6/2009 | Ngo | 132/216 |
| 2009/0181142 | A1 * | 7/2009 | Gaudry et al. | 426/383 |

(Continued)

OTHER PUBLICATIONS

"Fling Analog Joystick or iPad" http://tenonedesign.com/fling.php accessed May 10, 2011.

(Continued)

Primary Examiner — Amare Mengistu
Assistant Examiner — Crystal A Mathews
(74) Attorney, Agent, or Firm — Miller, Matthias & Hull LLP

(57) ABSTRACT

The disclosure herein provides for use of tactile feedback devices that may be removably coupled to a touchscreen interface. Aspects of the disclosure provide for the configuration of a virtual control of a device display according to characteristics of a tactile feedback device. The tactile feedback device provides a user with haptic feedback that increases the accuracy of input to the virtual control of the device display while decreasing the visual attention used to provide the input. Aspects allow for input to the virtual control adjacent to the tactile feedback device or via the tactile feedback device.

16 Claims, 8 Drawing Sheets

(56) References Cited

U.S. PATENT DOCUMENTS

| | | | |
|---|---|---|---|
| 2009/0309848 A1* | 12/2009 | Terada et al. | 345/173 |
| 2010/0079403 A1* | 4/2010 | Lynch et al. | 345/174 |
| 2010/0085317 A1* | 4/2010 | Park | G06F 1/1626 345/173 |
| 2010/0110016 A1* | 5/2010 | Ladouceur et al. | 345/173 |
| 2010/0177931 A1* | 7/2010 | Whytock et al. | 382/103 |
| 2010/0194677 A1* | 8/2010 | Fiebrink et al. | 345/156 |
| 2010/0259375 A1* | 10/2010 | Ferren | B60K 35/00 340/462 |
| 2010/0306650 A1* | 12/2010 | Oh et al. | 715/702 |
| 2010/0313124 A1* | 12/2010 | Privault et al. | 715/702 |
| 2011/0050587 A1* | 3/2011 | Natanzon et al. | 345/173 |
| 2011/0074739 A1* | 3/2011 | Kikin-Gil et al. | 345/176 |
| 2011/0102333 A1* | 5/2011 | Westerman | 345/173 |
| 2011/0134047 A1* | 6/2011 | Wigdor et al. | 345/173 |
| 2011/0157056 A1* | 6/2011 | Karpfinger | 345/173 |
| 2011/0184824 A1* | 7/2011 | George et al. | 705/24 |
| 2011/0199239 A1* | 8/2011 | Lutz et al. | 340/995.14 |
| 2011/0213322 A1* | 9/2011 | Cramer et al. | 604/344 |
| 2011/0227841 A1* | 9/2011 | Argiro | 345/173 |
| 2011/0239129 A1* | 9/2011 | Kummerfeld et al. | 715/750 |
| 2011/0260976 A1* | 10/2011 | Larsen et al. | 345/168 |
| 2011/0298721 A1* | 12/2011 | Eldridge | 345/173 |
| 2012/0007808 A1* | 1/2012 | Heatherly et al. | 345/173 |
| 2012/0054143 A1* | 3/2012 | Doig et al. | 706/47 |
| 2012/0084689 A1* | 4/2012 | Ledet | G06F 3/0486 715/769 |
| 2012/0154313 A1* | 6/2012 | Au et al. | 345/173 |
| 2012/0240044 A1* | 9/2012 | Johnson | G06F 3/0481 715/716 |
| 2012/0256862 A1* | 10/2012 | Wagner | 345/173 |

OTHER PUBLICATIONS

Gardner, Richard; "Toward Cockpit 3,0"; Aerospace Engineering and Manufacturing AvionicsFeature (aero-online.org) Oct. 27, 2010.

* cited by examiner

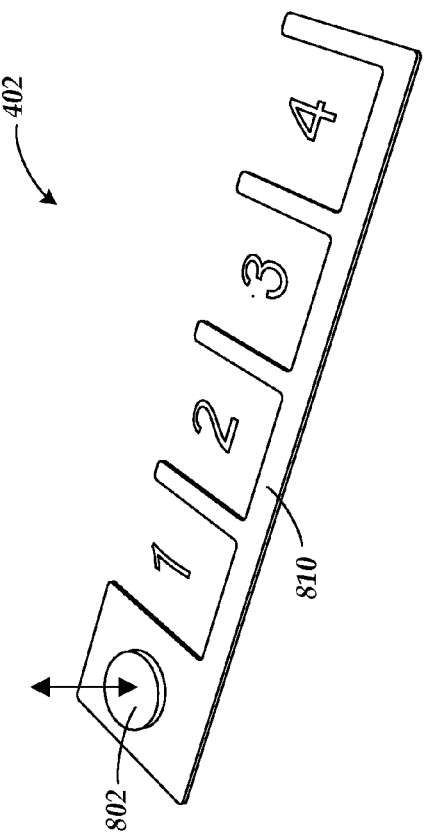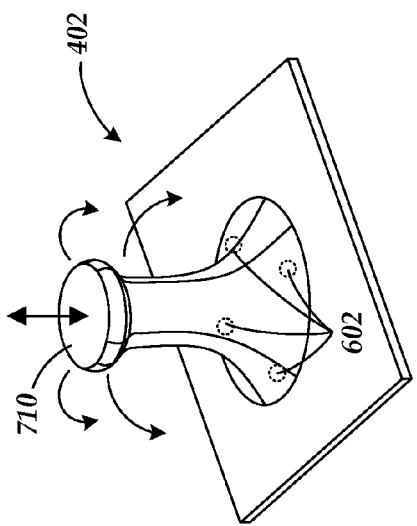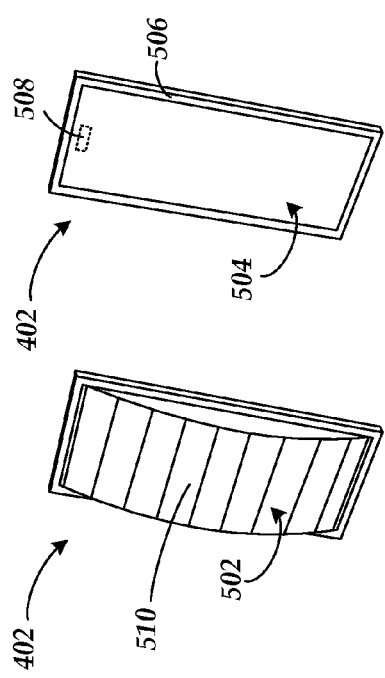
FIG. 5A  FIG. 5B
FIG. 6
FIG. 7
FIG. 8

TACTILE FEEDBACK DEVICES FOR CONFIGURABLE TOUCHSCREEN INTERFACES

BACKGROUND

Modern aircraft cockpits are becoming increasingly advanced with respect to avionics displays. Independent and separate conventional aircraft instruments are being combined into single multi-purpose displays that may be configured to show desired information from various aircraft systems as desired by the pilot or other crew member. Moreover, as technology improves, large portions of the aircraft cockpit may be replaced by one or more touchscreens that provide a user interface to any number and types of aircraft instrument displays. These touchscreens may allow a pilot or crew member to completely customize the instruments that are being displayed and where they are being displayed.

Although customizable touchscreen displays provide pilots with extensive flexibility to process vast quantities of information in an efficient manner, there are disadvantages to removing the traditional buttons, switches, and knobs that are common to traditional aircraft cockpit instrumentation. Specifically, the conventional cockpit controls not associated with touchscreen displays provide the pilot and crew with tactile reference points to which they are accustomed and trained to utilize with minimal visual attention devoted to locating and manipulating the controls. For example, in a conventional cockpit, the pilot typically knows exactly where a navigational display is located in the cockpit, where a corresponding control knob on the display is located, and is capable of reaching and turning the knob without diverting his or her attention from outside the aircraft or from some other task being performed simultaneously.

In contrast, in a cockpit in which the navigational display is depicted on a flat touchscreen, the conventional knob on the display may be replaced by a virtual knob or wheel that requires the pilot to precisely place his or her finger on the virtual control and rotate or slide the finger in a manner that changes the desired setting. While this action is not difficult, it may require accuracy and precision in that the pilot must find the correct location of the controls and perhaps repeatedly touch the same spot in a designated manner to control the instrument as intended. In order to locate the correct spot on the touchscreen to manipulate the desired controls, the pilot must look at the touchscreen and maintain visual contact while rotating, sliding, or pushing the virtual controls. This increased attention requirement as compared to the manipulation of conventional cockpit controls decreases the pilot's efficiency and increases the risk of an incorrect input or even of an incident due to the decreased ability to effectively multitask.

Moreover, due to the characteristics of a touchscreen display, parallax error may be introduced when a particular button or location is viewed from the side rather than directly in front of the button. This situation may occur with a display that is located between a pilot and co-pilot. The resulting parallax error may induce the pilot and co-pilot to touch slightly different locations on the touchscreen when attempting to touch the button. This inaccuracy may lead to an unintended press of an adjacent button, or an ineffective press of the desired button.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, computer-readable storage media, and apparatus described herein provide for the use of tactile feedback devices with a touchscreen interface to provide haptic feedback to a user for increased input accuracy and decreased visual distractions. The tactile feedback devices are removably coupled to the touchscreen interface and facilitate input to virtual controls of a device display positioned on the touchscreen interface. According to one aspect, a computer-implemented method includes providing a device display on the touchscreen interface and determining that a tactile feedback device is positioned on a surface of the touchscreen interface. One or more virtual controls associated with the device display are configured according to characteristics of the tactile feedback device.

According to another aspect, a computer-readable storage medium includes instructions that, when executed by a computer, cause the computer to configure a virtual control of a device display according to a tactile feedback device that is temporarily attached to a touchscreen interface. User input to the virtual control is received via the tactile feedback device and a corresponding response is provided.

According to yet another aspect, a tactile feedback device for use with a touchscreen interface includes an adhesive surface and a tactile surface. The adhesive surface is configured for removable attachment to the touchscreen interface. The tactile surface includes texture that distinguishes the tactile surface from the surface of the touchscreen interface. This aspect of the tactile surface aids a user in locating the tactile feedback device and providing input to a corresponding device display on the touchscreen interface.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 5A and 5B are front and rear perspective views, respectively, of a tactile feedback device configured as a wheel device according to various embodiments presented herein;

FIG. 6 is a perspective view of a tactile feedback device configured as a knob device according to various embodiments presented herein;

FIG. 7 is a perspective view of a tactile feedback device configured as a joystick device according to various embodiments presented herein;

FIG. 8 is a perspective view of a tactile feedback device configured as a virtual control framing device according to various embodiments presented herein;

DETAILED DESCRIPTION

Figure 1:
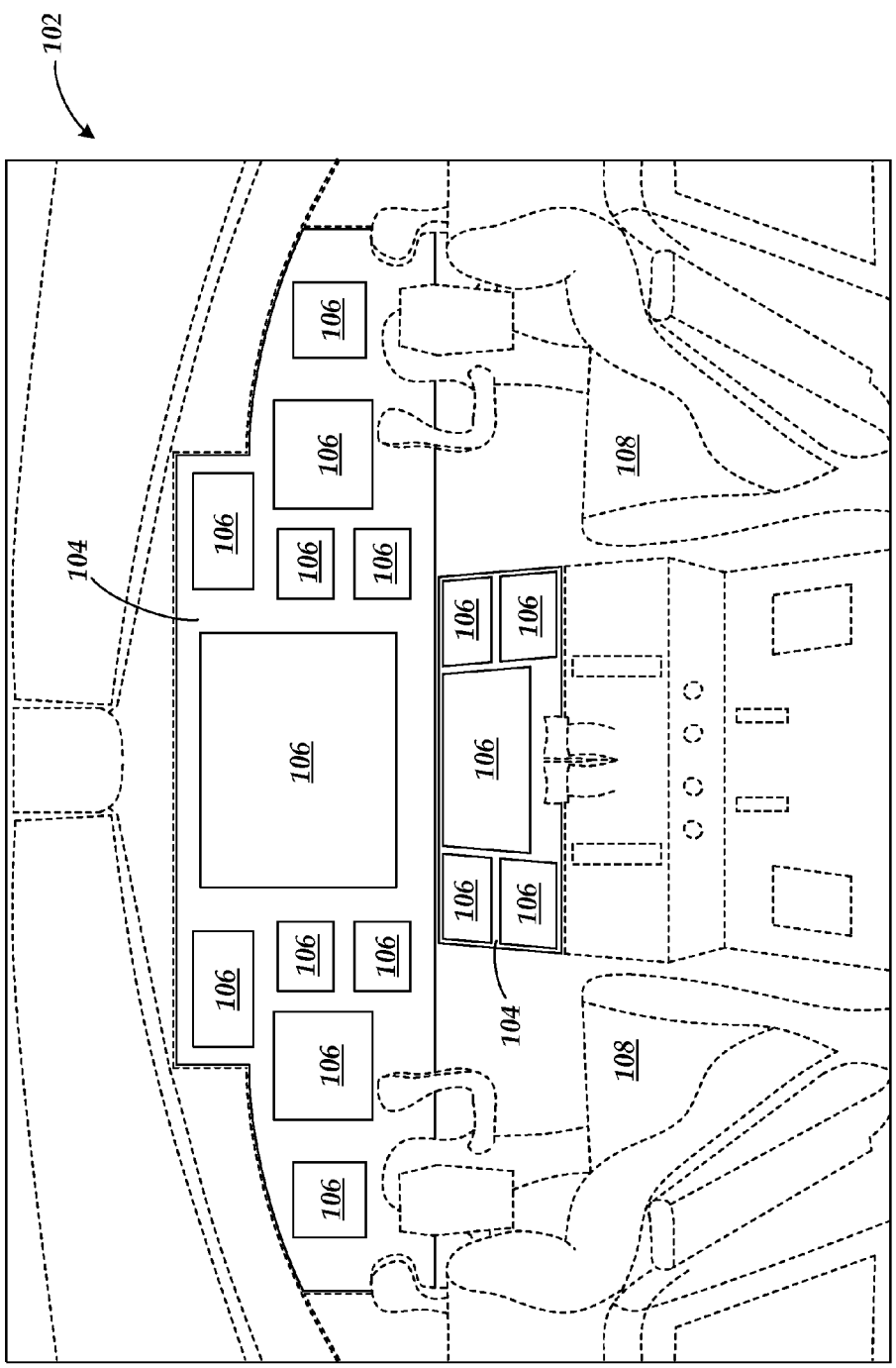
FIG. 1 is a cockpit view of an aircraft showing a configurable touchscreen interface according to various embodiments presented herein.

The following detailed description is directed to tactile feedback devices and use of these devices to assist a user when utilizing a configurable touchscreen. As discussed above, touchscreen interfaces are becoming increasingly popular in aircraft cockpits, as well as in a vast number of other applications. While extremely useful in providing the user with the flexibility to customize a particular touchscreen as desired, the virtual controls of a device displayed on the touchscreen often demand an accuracy when interacting with the controls that undesirably diverts the user's attention away from other tasks or may result in ineffective contact with the virtual controls.

Utilizing the concepts and technologies described herein, any number and type of various tactile feedback devices may be temporarily adhered to a touchscreen interface to provide a user with a tactile reference and haptic feedback that enables the user to accurately provide input at the proper virtual control location while maintaining attention on desired tasks. As used throughout this disclosure, the terms "touchscreen interface" and "touchscreen" may refer to any capacitive display device or other interface surface that allows a user to provide input to a corresponding device or system by interacting with one or more virtual controls represented on a display surface using a finger, stylus, or other mechanism. A "virtual control" may be any representation of a control mechanism depicted on the touchscreen surface that, when user interaction or manipulation is provided to the virtual control, results in a desired input to the device associated with the virtual control.

For example, a virtual control may include, but not be limited to, a representation of a button, knob, switch, sliding mechanism, roller, wheel, or any other user input device that is conventionally a physical control of a device used to accept user input. As is generally known by those with skill in the art, software may be utilized in conjunction with the touchscreen interface and virtual controls to recognize user contact with a virtual control and to recognize and appropriately act upon user manipulation of the virtual control. For example, a user may rotate his or her finger around a virtual knob or wheel just as he or she would do with a traditional knob or wheel of a conventional instrument display. Utilizing the corresponding software, a processor of a computing device recognizes the user input with respect to the virtual knob or wheel and initiates the corresponding device response.

In the following detailed description, references are made to the accompanying drawings that form a part hereof, and which are shown by way of illustration, specific embodiments, or examples. Referring now to the drawings, in which like numerals represent like elements through the several figures, tactile feedback devices and methods for providing tactile feedback to a touchscreen interface according to the various embodiments will be described.

FIG. 1 shows a view of a cockpit 102 of an aircraft. It should be understood that although the concepts described herein will be shown and described in the context of an aircraft cockpit, these concepts are equally applicable to any touchscreen interface environments. For example, the bridge of a ship or submarine may benefit from the use of the tactile feedback devices and touchscreen interfaces described herein. Essentially, the embodiments described herein may be utilized with any configurable touchscreen in which it is desirable to improve the accuracy of a user's input or to minimize the visual attention required to provide the input.

As seen in FIG. 1, the cockpit 102 includes one or more touchscreen interfaces 104. In this example, there is a large touchscreen interface 104 approximately spanning the width of the cockpit 102 in front of the pilot and co-pilot seats 108, and a second touchscreen interface 104 between the pilot and co-pilot seats 108. It should be appreciated that any number of touchscreen interfaces 104 may be used and may be configured with any desired size and shape without departing from the scope of this disclosure. According to this example, there are a number of device displays 106 positioned on the touchscreen interfaces 104. The number, size, shape, and positioning of the device displays 106 may vary.

Each device display 106 may correspond to an avionics unit or any other aircraft instrument or equipment and may be configured to present information to and/or receive input from a user via the touchscreen interface 104. Each device display 106 may include any number and type of virtual controls for receiving the user input. As an example, a device display 106 may include a navigation display that provides navigational information to a pilot and accepts input from the pilot via virtual knobs, switches, and/or buttons with respect to frequencies or identification codes associated with ground-based navigational equipment, desired display options for presenting the desired navigational information, and zoom and pan controls.

Figure 2:
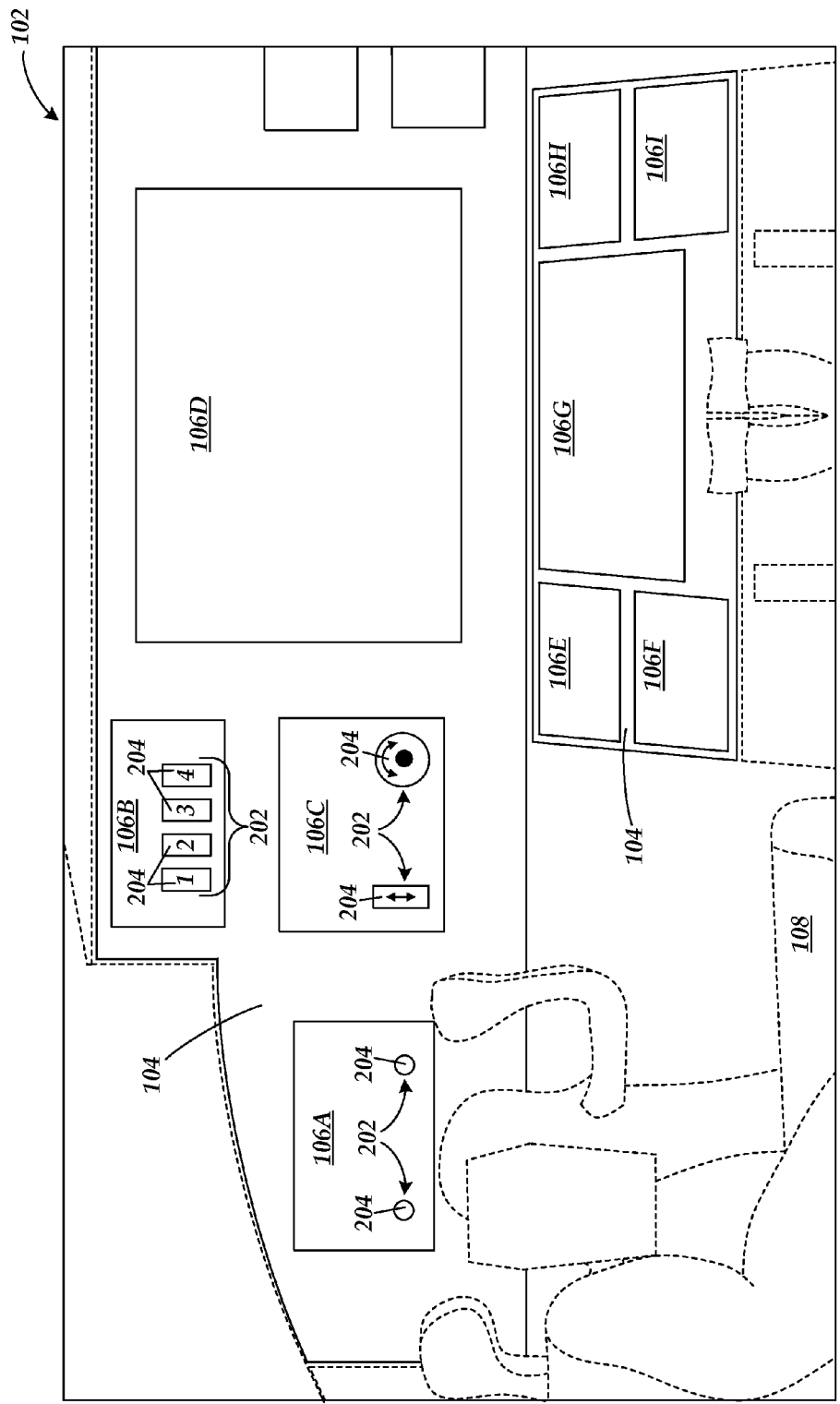
FIG. 2 is an enlarged view of a portion of a cockpit of an aircraft showing an example implementation of device displays arranged on a configurable touchscreen interface according to various embodiments presented herein.

FIG. 2 shows an enlarged view of a portion of the cockpit 102, showing portions of the touchscreen interface 104 that are in front of and adjacent to the pilot in the left pilot seat 108. In this enlarged view, various virtual controls 202 can be seen on number of the device displays 106A-106I. For clarity purposes, only a limited number of virtual controls 202 are shown, and are only depicted with respect to the device displays 106A, 106B, and 106C. It should be appreciated that any number and type of virtual controls 202 may be utilized with any of the device displays 106A-106I.

According to this example, the device display 106A corresponds to an instrument that accepts user input via buttons as the virtual controls 202. To provide input, a pilot or other user could make contact with a user input area 204 of one or both of the buttons using a finger, stylus, or other device. The device display 106B corresponds to an instrument that accepts user input to set a particular code or frequency. In this example, the virtual controls 202 include four boxes corresponding to four numbers that may be changed via scrolling up or down within the user input area 204 each of the designated boxes. The device display 106C corresponds to an instrument having two virtual controls 202, with the first being a virtual wheel that accepts up and down sliding of a finger in the user input area 204 on the surface of the touchscreen in order to simulate scrolling, and the second being a virtual knob that accepts circular finger contact within a circular user input area 204 to simulate the turning of a knob.

Without the concepts described herein, because there are no buttons, wheels, switches, or knobs projecting outward from the touchscreen interface 104, the pilot may have difficulty accurately placing his or her finger within the user input areas 204 of the virtual controls 202 without dedicating more attention to the input than is desirable, particularly while multitasking or while flying through turbulence. This is particularly true if the touchscreen interface 104 allows the pilot to customize the configuration of the device displays 106 to position them in any desired location.

Figure 3:
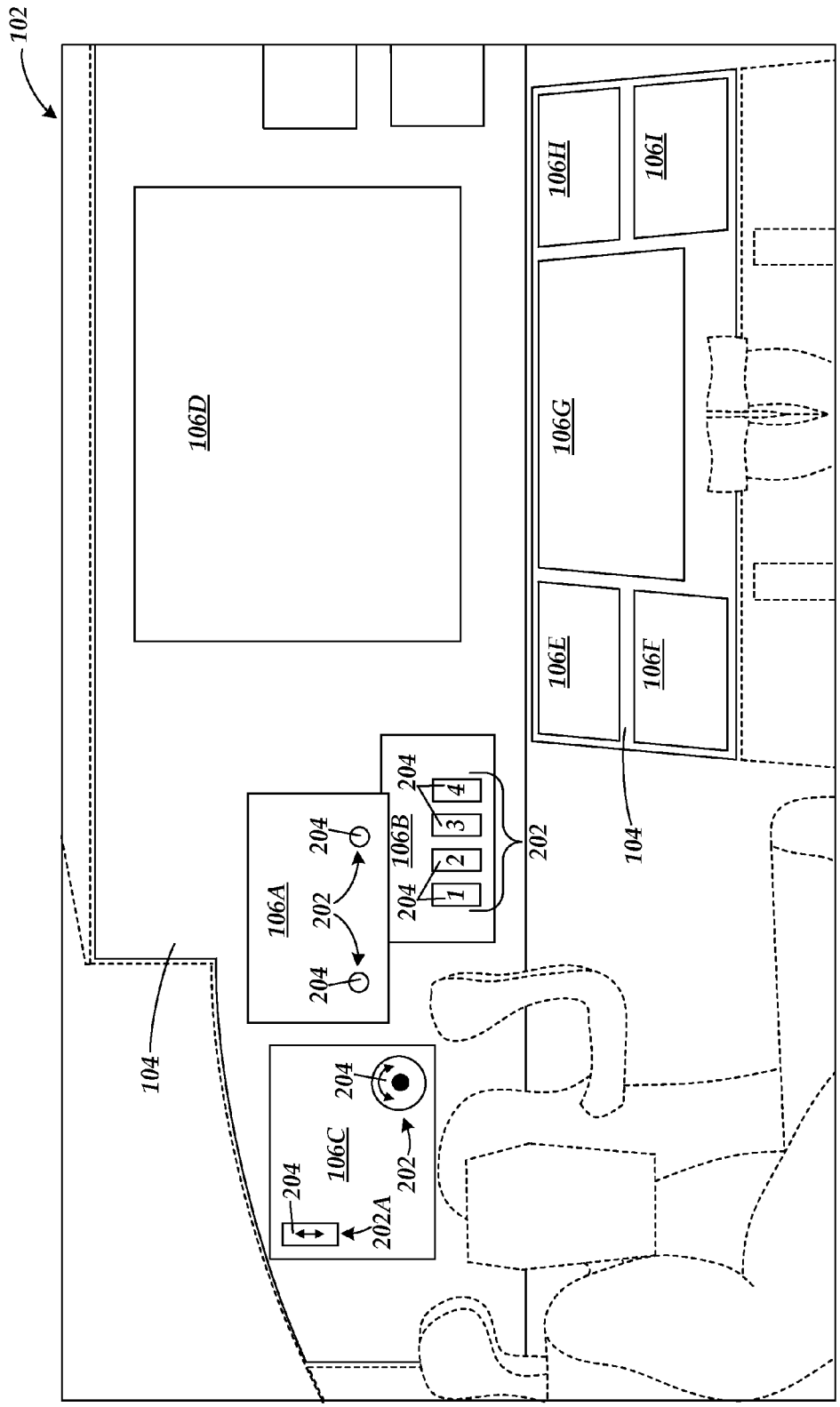
FIG. 3 is the enlarged view of the cockpit shown in FIG. 2, showing an alternative arrangement of the device displays on the configurable touchscreen interface.

Looking at FIG. 3, in this example, the pilot has rearranged the device displays 106A, 106B, and 106C on the touchscreen interface 104 as compared to the layout of these displays in FIG. 2. It is contemplated that any particular implementation of the touchscreen interface 104 may designate locations for the device displays 106, or the user may be able to drag and drop or otherwise position the device displays 106 as desired to create a completely customized instrument configuration. As seen in this example, the pilot has chosen to relocate the device displays 106A-106C. Moreover, the pilot has also decided to relocate the virtual control 202A within the device display 106C. According to various embodiments, each device display 106 may be configurable to allow for the desired placement of the corresponding virtual controls 202 within that particular display.

The concepts provided herein may be particularly useful when customizing a particular device display 106 in a manner that relocates one or more virtual controls 202 to a position within the display that is not a conventional position for the control. In these embodiments, without the tactile feedback provided herein, the pilot may find that a prolonged visual search for the relocated virtual control 202 is required, resulting in an undesirable distraction. As will be described in detail below, the tactile feedback devices disclosed herein may not only provide a tactile reference for quickly locating the virtual control 202A, but may also simplify the positioning of the virtual control 202A when customizing the device display 106C.

Figure 4:
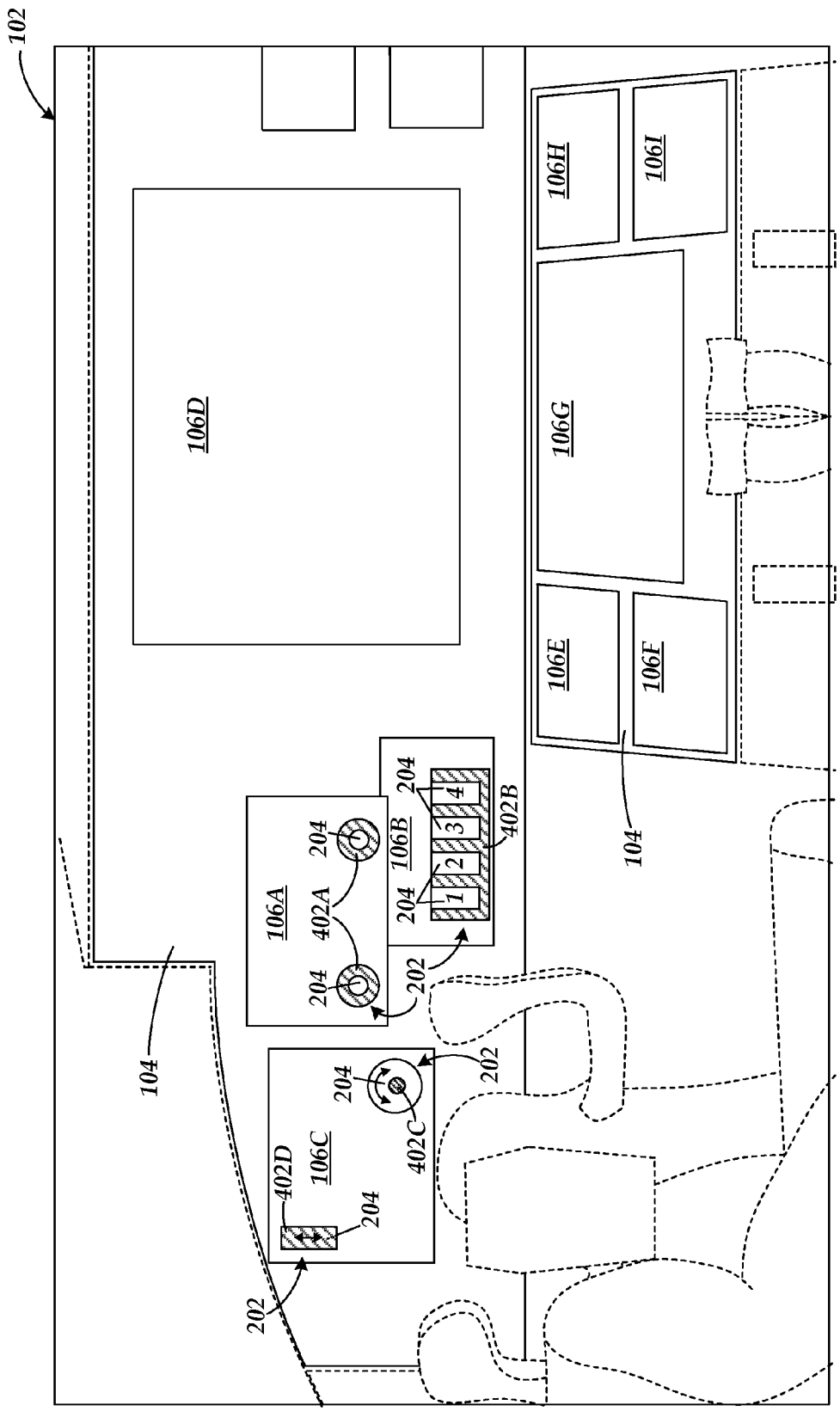
FIG. 4 is the enlarged view of the cockpit shown in FIG. 3, showing use of tactile feedback devices with the device displays according to various embodiments presented herein.

FIG. 4 shows the cockpit 102 of FIG. 3, with a number of tactile feedback devices 402A-402D (collectively referred to as 402) adhered to the surface of the touchscreen interface 104. The tactile feedback devices 402 are positioned in locations corresponding to the virtual controls 202 of the device displays 106A-106C. It should again be understood that the specific tactile feedback devices 402 shown are for illustrative purposes only. According to the various embodiments, there are numerous types of tactile feedback devices 402. The manner in which any particular tactile feedback device 402 operates to assist the user in manipulating a virtual control 202, as well as the shape, size, and textural features of each tactile feedback device 402, may differ. As will be discussed in further detail below with respect to FIGS. 5-8 any number and type of tactile feedback devices 402 may be used depending upon the type of a corresponding virtual control 202, as well as a personal choice of the user.

According to this example, the device display 106A has two tactile feedback devices 402A that are configured to assist the pilot in locating a user input area 204 representing a button. These buttons may be activated by making contact with the user input area 204 with a finger or other input device. In this example, the tactile feedback devices 402 may each include a tactile surface that is adhered to, and therefore raised from, the surface of the touchscreen interface 104. The tactile surfaces of these and other tactile feedback devices 402 described with respect to FIG. 4 are represented by a hatched pattern for clarity. Here, the tactile surfaces of the tactile feedback devices 402A consist of a substantially circular material having an aperture that is sized and shaped according to the user input area 204 of the virtual control 202. In practice, the pilot can reach toward the device display 106A and quickly and easily activate the desired virtual control 202 by touching the appropriate tactile feedback device 402A and allowing the device to guide his or her finger through the aperture to contact the user input area 204.

According to this example, the device display 106B has a tactile feedback device 402B that is configured for a multi-digit code entry. As described above, the virtual controls 202 of the device display 106B include four boxes corresponding to four numbers that may be changed via scrolling up or down within the user input area 204 each of the designated boxes. The tactile feedback device 402B includes a tactile surface that frames or surrounds the boxes containing the user input areas 204 for inputting the various digits of the desired code or frequency. In practice, the tactile feedback device 402B assists the pilot by providing a tactile reference point for a finger and guiding the finger to the various user input areas 204. It should be appreciated that one or more locations of the tactile surface of the tactile feedback device 402B may include a projection (not shown) or other tactile feedback that distinguishes an adjacent user input area 204, similar to a projection on an "F" or "J" key of a conventional keyboard. The projection(s) on the tactile feedback device 402B may provide a tactile reference point to guide the pilot's finger to a known location on the tactile feedback device 402B to facilitate user input with minimal visual distractions.

As described above, the device display 106C of this example includes two virtual controls 202. Addressing the virtual knob shown in the lower right portion of the display first, according to this example, the tactile feedback device 402C includes a tactile surface that is centered within the virtual control 202 such that the user input area 204 is adjacent to and encircles the tactile feedback device 402C. In doing so, the pilot is provided with a substantially cylindrical projection around which he or she may rotate his or her finger within the user input area 204 to simulate rotating a knob.

The virtual wheel is shown in the upper left portion of the device display 106C, which is a virtual control 202 that accepts up and down sliding of a finger in the user input area 204 to simulate scrolling. According to this example, the tactile feedback device 402D is placed directly over the user input area 204. With this implementation, the pilot or user slides a finger up or down over the tactile surface while applying slight pressure in order to provide the same input as would be provided if the finger was slid up or down while in direct contact with the user input area 204 on the surface of the touchscreen interface 104. The manner in which the contact from the user's finger is translated through the tactile feedback device 402D to the user input area 204 depends on the characteristics of the touchscreen interface 104.

According to one embodiment, the touchscreen interface 104 is a capacitive display device in which a conductor such as the human finger is used to interact with the touchscreen interface to communicate with the underlying software. In this embodiment, the tactile feedback device 402D may have a conductive element configured to simulate the conductive properties of a finger so that contact between the conductive element and the touchscreen interface 104 is equivalent to contact between a finger and the touchscreen interface 104. According to various embodiments, the conductive element may include a conductive bottom surface or a conductive layer proximate to the bottom surface such that pressure applied to an opposing top surface translates through the device and brings the conductive bottom surface, or conductive layer, in close proximity to the touchscreen interface 104. Doing so allows the tactile feedback device 402D to provide input to the corresponding software in much the same manner as would occur if a finger or other conductive device were placed in direct contact with the user input area 204 without the use of the tactile feedback device 402D.

According to an alternative embodiment, the touchscreen interface 104 may be a resistive, acoustic wave, or similar type of interface that relies on pressure to the surface of the display to provide input to the underlying software. In this embodiment, the tactile feedback device 402D may simply be capable of transmitting pressure applied to a top surface through the device to a bottom surface in contact with the touchscreen interface 104 so that sliding a finger down the tactile feedback device 402D is equivalent to sliding a finger directly down the user input area 204 underneath the tactile feedback device 402D.

Turning now to FIGS. 5A-8, various illustrative examples of tactile feedback devices 402 will be described. FIGS. 5A and 5B show perspective views of a front side, or tactile surface 502, and a rear side, or adhesive surface 504, respectively, of a tactile feedback device 402 that is configured to simulate a wheel 510. This example is similar to the tactile feedback device 402D described above with respect to FIG. 4. According to this example, the tactile surface 502 may be an elastic or flexible material and may be configured with a curved outer surface so as to simulate a wheel and provide the pilot or user with the appropriate haptic feedback while sliding a finger up or down the device. Alternatively, the tactile surface may be any rigid or elastic material capable of transmitting force or conductivity through the adhesive surface 504 to the user input area 204 of the device display 106 underneath. The tactile surface 502 may have any desired texture according to a user's preference. According to one embodiment, the tactile feedback devices 402 used on a single touchscreen interface 104 utilize multiple distinct textures on the tactile surfaces 502 in order to assist the user in distinguishing between various tactile feedback devices 402 by touch.

FIG. 5B shows the adhesive surface 504 of the tactile feedback device 402. The adhesive surface 504 may be configured to temporarily attach to the surface of the touchscreen interface 104. Methods of attachment may include, but are not limited to, an adhesive, suction, static cling, and/or friction. According to one embodiment, the tactile feedback device 402 may include a boundary definition implement 506 that defines the outer boundaries of a device input area of the tactile feedback device 402. When attached to the touchscreen interface 104, the software associated with the corresponding device display 106 may be capable of detecting the boundary definition implement 506 and utilizing this information to define the device input area of the tactile feedback device 402. The device input area is the area through which user input will be transferred through the tactile surface 502 to the user input area 204 of the virtual control 202 under the tactile feedback device 402. The software will accept user input within this device input area defined by the boundary definition implement 506 and respond accordingly.

The device input area defined by the boundary definition implement 506 may correspond precisely with the user input area 204 of the virtual control 202 of the associated device display 106. Alternatively, the device input area may not be precisely the same shape, size, or location of the corresponding user input area 204, in which case the software may adjust the user input area 204 to match the characteristics of the device input area. In this manner, the pilot may place the tactile feedback device 402 in a desired location close to the user input area 204 of a virtual control 202 and have the device display 106 calibrate to the tactile feedback device 402 without having to be completely accurate in placing the tactile feedback device 402.

Similarly, the tactile feedback device 402 may include an identifier 508 that is detectable by the software corresponding to the device display 106. The identifier 508 may include any quantity and type of stored data that provides the software with information regarding the tactile feedback device 402. For example, the identifier 508 may notify the software that a particular type of tactile feedback device 402 is located on the touchscreen interface 104 at a particular location with respect to the device display 106 and will be used to control a particular virtual control 202. Moreover, the identifier 508 may include information that defines the device input area described above. It should be appreciated that the identifier 508 may be incorporated into the boundary definition implement 506 or vice versa. The identifier 508 and/or the boundary definition implement 506 may additionally trigger a calibration process upon detection by the software when the tactile feedback device 402 is attached to the touchscreen interface 104.

As an illustrative example, returning to FIGS. 2-4, a pilot may enter the cockpit 102 and reposition the device display 106C from a first position shown in FIG. 2 to a second position shown in FIG. 3. After configuring the touchscreen interface 104 as desired, the pilot may place the tactile feedback device 402D in the position shown on the device display 106C in FIG. 4. The software associated with the device display 106C may detect the identifier 508 within tactile feedback device 402D, and based on the positioning of the identifier 508 on the device display 106C, place the virtual control 202 associated with that identifier 508 at a position such that the user input area 204 is underlying the device input area of the tactile feedback device 402D. The pilot has now quickly and easily configured the virtual controls 202 of the device display 106C, while providing a tactile feedback device 402D that will assist him or her with accurately locating and utilizing the corresponding virtual control 202 of the device display 106C during flight.

FIG. 6 shows an embodiment of a tactile feedback device 402 that is configured as a rotatable knob 610. This tactile feedback device 402 may be utilized with virtual controls 202 that require circular finger movement to simulate the turning of a knob. This tactile feedback device 402 may be used in multiple capacities as indicated by the various action arrows 604, 606, and 608. First, the tactile feedback device 402 shown here may be centered within a virtual control 202 as described above with respect to the tactile feedback device 402C in FIG. 4. In this manner, the user may rotate a finger around the tactile feedback device 402 within a circular user input area 204 as indicated by the action arrow 604. In this capacity, the tactile feedback device 402 provides a static physical reference point that the pilot or user may rely on to ensure that the input being provided is accurately placed with minimal visual attention.

Alternatively, the tactile feedback device 402 of FIG. 6 may be sized to overlap the user input area 204 associated with a virtual knob. As indicated by the action arrow 606, the user could rotate the knob 610 to provide the desired input to the user input area 204 of the virtual control 202. In this embodiment, the bottom surface may include a conductive element such as a conductive contact 602 that rotates on a surface of the touchscreen interface 104 within the user input area 204 of the virtual control 202 on which the tactile feedback device 402 is attached. As the user rotates the knob 610, the conductive contact 602 translates the rotation into a user input as if the user had rotated a finger on the surface of the touchscreen interface 104 within the applicable user input area 204. Further embodiments of the tactile feedback device 402 shown in FIG. 6 may include push button action of the knob as shown by the action arrow 608. According to these embodiments, the tactile feedback device 402 may allow the pilot to push on the knob 610 to provide pressure contact or conductive contact via the conductive contact 602 to the virtual control 202 underneath. This embodiment may be utilized with virtual controls 202 that are configured as buttons as well, without utilizing any rotational aspects of the knob 610 described above.

FIG. 7 shows an implementation of a tactile feedback device 402 that is configured as a joystick 710. According to this embodiment, the tactile feedback device 402 may include a number of conductive contacts 602 proximate to the bottom surface so that movement of the joystick 710 applies pressure to one or more corresponding conductive contact, which then provides input to the virtual control 202 underneath the tactile feedback device 402. In this manner, the joystick 710 may be used to control a curser or other aspect of a device display 106.

FIG. 8 shows an embodiment of a tactile feedback device 402 that is configured as a virtual control framing device 810. As described above with respect to the tactile feedback device 402B of FIG. 4, the virtual control framing device 810 may be useful in providing a tactile reference for entering codes or frequencies in multiple adjacent user input areas 204. According to this implementation, the virtual control framing device 810 additionally includes a button 802 that allows a user to press a virtual control 202 underneath in the manner described above. An example implementation for this type of code-entry template 810 would be for use with an aircraft transponder in which the button 802 may be pressed to activate an "identify" action, while the template provides guidance to the user input areas 204 for inputting a transponder code.

It should be understood that the disclosure provided herein is not limited to the particular embodiments shown and described with respect to FIGS. 4-8 above. Rather, any physical device that may be temporarily attached to a touchscreen interface 104 to provide tactile guidance to an adjacent or underlying virtual control 202 may be utilized as a tactile feedback device 402. According to some embodiments, the tactile feedback device 402 may simply tactilely identify the location of an adjacent virtual control 202, while other embodiments provide tactile feedback devices 402 that are used to provide the user input to the virtual control 202 without the user directly contacting the user input area 204 with a finger. Further embodiments incorporate identifiers 508 and/or boundary definition implements 506 that allow the software associated with the corresponding device display 106 to identify the tactile feedback devices 402, customize the virtual controls 202 accordingly, and initiate calibration sequences.

Moreover, it should be understood that the tactile feedback devices 402 may be manufactured utilizing any suitable material. According to one embodiment, the tactile feedback devices 402 are permanently configured for a particular type of virtual control 202, such as the wheel 510, knob 610, and joystick 710 for example. A tactile feedback device kit containing numerous types of tactile feedback devices 402 may be positioned within a cockpit 102 for use by any pilot as desired. However, according to an alternative embodiment, the tactile feedback device 402 may include a formal material that may be "sculpted" or formed to the desired size and shape and stuck to the touchscreen interface 104 in one or more desired locations. This embodiment is useful when the tactile feedback device 402 is merely used to provide a tactile marker of a particular location on a device display 106. It should also be appreciated that embodiments are contemplated in which springs, vibration mechanisms, audio components, and any other types of known feedback devices are incorporated into a tactile feedback device 402 in order to increase or enhance the feedback provided to the user.

Figure 9:
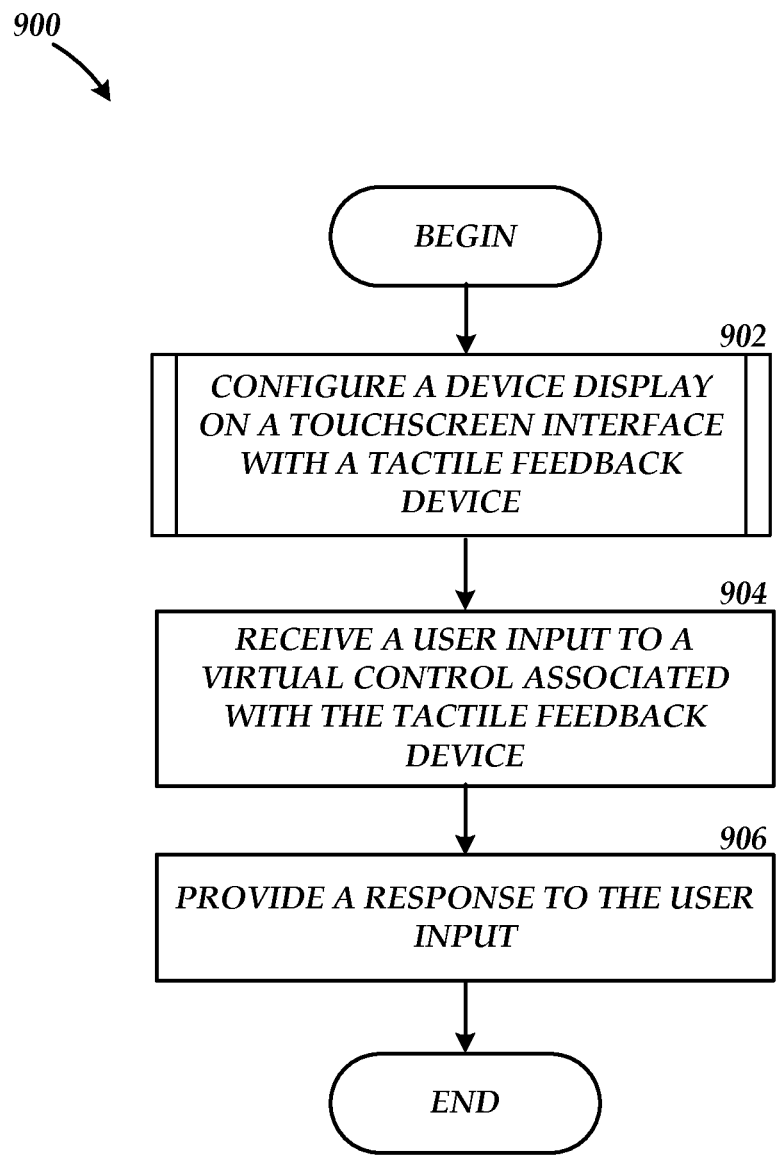
FIG. 9 is a flow diagram showing a method of providing tactile feedback to a touchscreen interface according to various embodiments presented herein.
Figure 10:
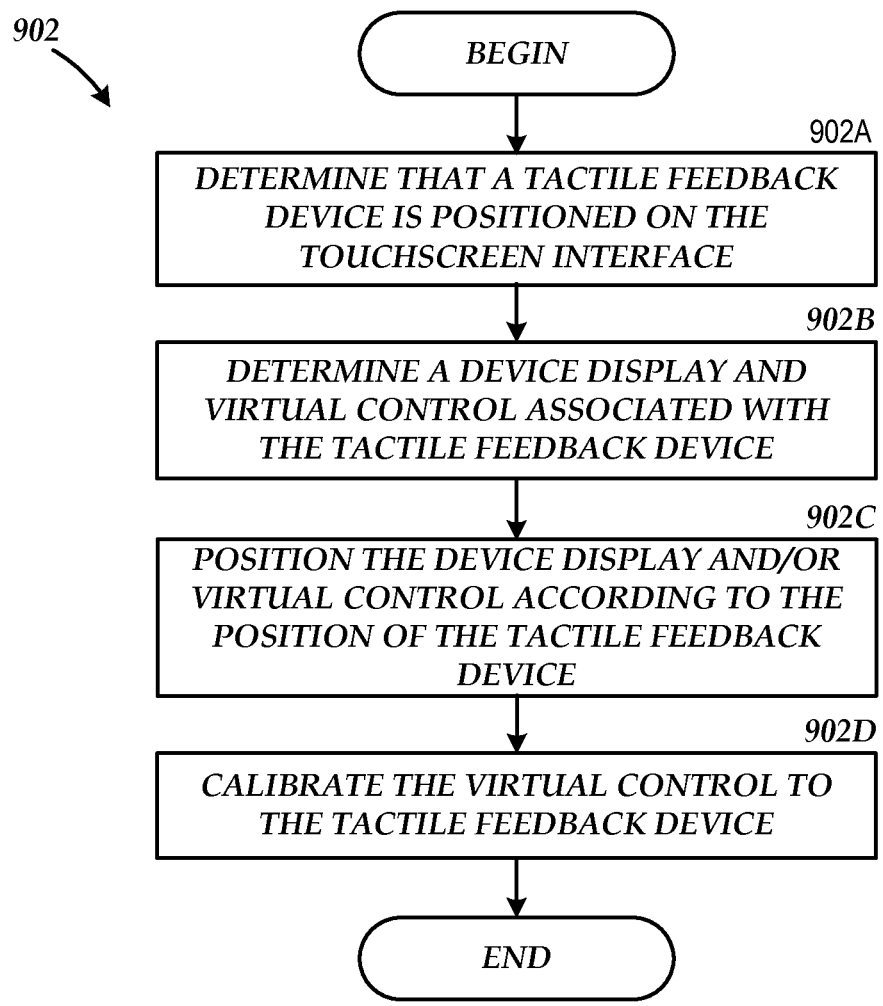
FIG. 10 is a flow diagram showing further details with respect to an operation of FIG. 9 corresponding to configuring a device display on a touchscreen interface according to various embodiments presented herein.

Turning now to FIGS. 9 and 10, an illustrative routine 900 for providing tactile feedback to a user of a touchscreen interface will now be described in detail. It should be appreciated that the logical operations described herein with respect to FIGS. 9 and 10 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The routine 900 begins at operation 902, where a touchscreen control application associated with the touchscreen interface 104 or a device display 106 configures the device display 106 on the touchscreen interface with a tactile feedback device 402. According to embodiments in which the tactile feedback device 402 does not provide any data to the device display 106 and is used only to provide a tactile reference for locating a corresponding virtual control 202, this operation may include positioning the device display 106 on the touchscreen interface 104 at a predetermined or customized location. Any number of tactile feedback devices 402 may then positioned with respect to the associated virtual controls 202 of the device display 106. However, according to embodiments in which the tactile feedback device 402 is detectable by the touchscreen control application, operation 902 is further defined below with respect to FIG. 10.

From operation 902, the routine 900 continues to operation 904, where the touchscreen control application receives a user input to a virtual control 202 associated with the tactile feedback device 402. As discussed above, this input may include direct contact by a user's finger with the user input area 204 of the virtual control 202, or may include the appropriate input from the tactile feedback device 402 to the user input area 204. At operation 906, the touchscreen control application provides the appropriate response according to the user input received and the routine 900 ends. For example, if the user initiates input either directly or via a tactile feedback device 402 to turn an aircraft system on, the touchscreen control application will receive the input and operate according to stored computer-executable instructions to turn the aircraft system on.

FIG. 10 shows an illustrative subroutine 902 corresponding to operation 902 of the routine 900 discussed above, providing further details as to the configuration of the device display 106 on the touchscreen interface 104. Subroutine 902 begins at operation 902A, where the touchscreen control application determines that a tactile feedback device 402 is positioned on the touchscreen interface 104. This determination may occur in various ways. According to one embodiment, a user may push a button or otherwise initiate a virtual control calibration trigger or other trigger that instructs the touchscreen control application to search for a tactile feedback device 402, and may continue with calibration per operation 902D described below. As mentioned above, the tactile feedback device 402 may include an identifier 508 and/or a boundary definition implement 506 that may identify the position of the tactile feedback device 402 as well as provide additional information described above. Alternatively, due to the proximity of an identifier 508 and/or a boundary definition implement 506 to the touchscreen interface 104 when the tactile feedback device 402 is attached to the touchscreen interface 104, the coupling of the tactile feedback device 402 to the display may trigger the detection of the tactile feedback device 402 and corresponding position by the touchscreen control application.

From operation 902A, the subroutine 902 continues to operation 902B, where the touchscreen control application determines a device display 106 and a virtual control 202 to associate with the tactile feedback device 402. According to one example embodiment, the identifier 508 of tactile feedback device 402 provides the touchscreen control application with information regarding the device display 106 and/or virtual control 202 with which the tactile feedback device 402 is to be utilized. According to another embodiment, the tactile feedback device 402 is placed on the particular device display 106 with which it will be used, but not necessarily on or adjacent to a particular virtual control 202 of the device display 106. In this embodiment, the touchscreen control application may determine from the information stored with the identifier 508 the virtual control 202 the tactile feedback device 402 will be used with. Alternatively, the touchscreen control application may determine the virtual control 202 according to the type of tactile feedback device 402 that has been placed on the device display 106.

The subroutine 902 continues from operation 902B to operation 902C, where the touchscreen control application positions the device display 106 and/or the virtual control 202 according to the position of the tactile feedback device 402. For example, if the tactile feedback device 402 has been placed on the touchscreen interface 104, but not on a device display 106, and the application is able to determine from the identifier 508 what device display 106 and virtual control 202 the tactile feedback device 402 is to be used with, then the touchscreen control application may position the device display 106 around the location of the tactile feedback device 402 and position the applicable virtual control 202 accordingly with respect to the location of the tactile feedback device 402 and a predetermined location of the virtual control 202 within the device display 106. According to another embodiment, if the tactile feedback device 402 has been placed on a particular device display 106, the touchscreen control application may position the corresponding virtual control 202 according to the position of the tactile feedback device 402 within the device display 106.

From operation 902C, the subroutine 902 continues to 902D, where the touchscreen control application calibrates the virtual control 202 to the tactile feedback device 402. This calibration may occur as the result of detecting a virtual control calibration trigger. The trigger may be a user input via a button or other control, or may be the detection of the tactile feedback device 402 in contact with the touchscreen interface 104. Upon detection of the calibration trigger, the touchscreen control application initiates a virtual control calibration routine. This routine is operative to calibrate the software with the particular location of the virtual control 202 and the applicable user input area 204 with respect to the device display 106 and touchscreen interface 104. Calibration techniques for touchscreen applications are well known. After calibration, the tactile feedback device 402 and corresponding device display 106 and virtual control 202 are ready for use and the subroutine 902 returns to operation 904 of the routine 900 described above with respect to FIG. 9.

Figure 11:
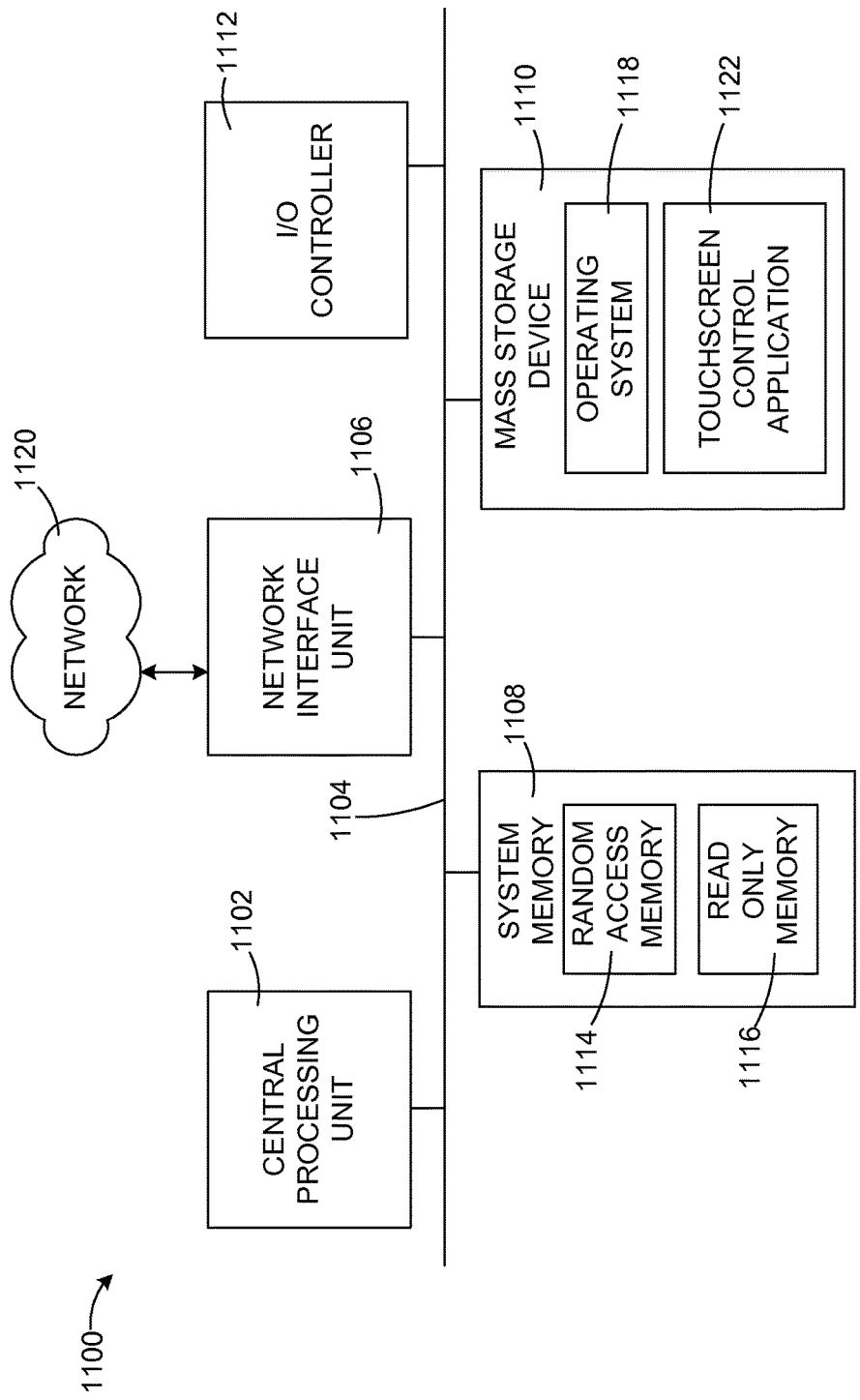
FIG. 11 is a computer architecture diagram showing an illustrative computer hardware and software architecture for a computing system capable of implementing the embodiments presented herein.

FIG. 11 shows an illustrative computer architecture for a computer 1100 capable of executing the software components described herein for providing aerial refueling operations. The computer architecture shown in FIG. 11 illustrates a conventional desktop, laptop computer, server computer, or any flight computer configured for use with an aircraft system and may be utilized to implement the computer 1100 and to execute any of the other software components described herein.

The computer architecture shown in FIG. 11 includes a central processing unit 1102 (CPU), a system memory 1108, including a random access memory 1114 (RAM) and a read-only memory (ROM) 816, and a system bus 1104 that couples the memory to the CPU 1102. A basic input/output system (BIOS) containing the basic routines that help to transfer information between elements within the computer 1100, such as during startup, is stored in the ROM 816. The computer 1100 further includes a mass storage device 1110 for storing an operating system 1118, application programs, and other program modules, which will be described in greater detail below.

The mass storage device 1110 is connected to the CPU 1102 through a mass storage controller (not shown) connected to the bus 1104. The mass storage device 1110 and its associated computer-readable media provide non-volatile storage for the computer 1100. Although the description of computer-readable media contained herein refers to a mass storage device, such as a hard disk or CD-ROM drive, it should be appreciated by those skilled in the art that computer-readable storage media can be any available computer storage media that can be accessed by the computer 1100.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any non-transitory medium which can be used to store the desired information and which can be accessed by the computer 1100.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 1100 may operate in a networked environment using logical connections to remote computers through a network such as the network 1120. The computer 1100 may connect to the network 1120 through a network interface unit 1106 connected to the bus 1104. It should be appreciated that the network interface unit 1106 may also be utilized to connect to other types of networks and remote computer systems. The computer 1100 may also include an input/output controller 1112 for receiving and processing input from a number of other devices, including a touchscreen interface 104, keyboard, mouse, joystick, or electronic stylus (not shown in FIG. 11). Similarly, an input/output controller may provide output to a display screen, a printer, or other type of output device (also not shown in FIG. 11).

As mentioned briefly above, a number of program modules and data files may be stored in the mass storage device 1110 and RAM 1114 of the computer 1100, including an operating system 1118 suitable for controlling the operation of a networked desktop, laptop, server, or other flight computer. The mass storage device 1110 and RAM 1114 may also store one or more program modules. In particular, the mass storage device 1110 and the RAM 1114 may store the touchscreen control application 1122 executable to perform the various operations described above. The mass storage device 1110 and RAM 1114 may also store other program modules and data.

In general, software applications or modules may, when loaded into the CPU 1102 and executed, transform the CPU 1102 and the overall computer 1100 from a general-purpose computing system into a special-purpose computing system customized to perform the functionality presented herein. The CPU 1102 may be constructed from any number of transistors or other discrete circuit elements, which may individually or collectively assume any number of states. More specifically, the CPU 1102 may operate as one or more finite-state machines, in response to executable instructions contained within the software or modules. These computer-executable instructions may transform the CPU 1102 by specifying how the CPU 1102 transitions between states, thereby physically transforming the transistors or other discrete hardware elements constituting the CPU 1102.

Encoding the software or modules onto a mass storage device may also transform the physical structure of the mass storage device or associated computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer-readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for providing tactile feedback to a user of a touchscreen interface, the method comprising:
    providing the touchscreen interface;
    displaying a device display in a first position on the touchscreen interface independent of any tactile feedback device such that the device display does not correspond to any tactile feedback device, the device display corresponding to an instrument displayed on the touchscreen interface;
    displaying a virtual control on the device display such that the device display comprises a first display configuration with the virtual control located at a first virtual control position on the device display;
    one of
        relocating the device display being displayed on the touchscreen interface from the first position to a second position, the second position being according to a position of a tactile feedback device positioned on a surface of the touchscreen interface at the second position while maintaining the first display configuration; or
        relocating the virtual control being displayed within the device display from a first virtual control position to a second virtual control position according to a position of the tactile feedback device on the device display while the device display is maintained on the touchscreen interface at the first position such that the instrument comprises a second display configuration with the virtual control located at a second virtual control position on the device display,
    wherein the tactile feedback device comprises a tactile reference that substantially frames the virtual control and that guides user input on the tactile reference to the virtual control on the touchscreen interface.

2. The computer-implemented method of claim 1, further comprising:
- receiving a user input to the virtual control via the tactile feedback device; and
- providing a response to the user input.

3. The computer-implemented method of claim 1, further comprising determining a position of the tactile feedback device on the surface of the touchscreen interface by detecting an identifier of the tactile feedback device.

4. The computer-implemented method of claim 1, further comprising configuring the virtual control of the device display according to the position of the tactile feedback device.

5. The computer-implemented method of claim 1, further comprising determining a position of the tactile feedback device on the surface of the touchscreen interface by detecting a virtual control calibration trigger.

6. The computer-implemented method of claim 5, wherein the virtual control calibration trigger comprises a user initiated request.

7. The computer-implemented method of claim 6, wherein the virtual control calibration trigger comprises one of an identifier or a boundary definition implement associated with the tactile feedback device.

8. The computer-implemented method of claim 5, further comprising:
- in response to detecting the virtual control calibration trigger, executing a virtual control calibration routine to determine the position of the tactile feedback device; and
- in response to the virtual control calibration routine, defining a user input area of the virtual control according to the position of the tactile feedback device.

9. The computer-implemented method of claim 8, wherein the user input area substantially abuts the tactile feedback device.

10. The computer-implemented method of claim 8, wherein the user input area is defined between the touchscreen interface and a bottom surface of the tactile feedback device wherein user input is provided to the user input area of the virtual control via the tactile feedback device.

11. The computer-implemented method of claim 1, wherein the tactile feedback device comprises:
- an adhesive surface configured for removable coupling to the touchscreen interface; and
- a tactile surface comprising a texture configured to distinguish the tactile surface from a surface of the touchscreen interface.

12. The computer-implemented method of claim 1, further comprising providing a plurality of virtual controls within the device display and moving at least one of the virtual controls relative to another one of the virtual controls in response to the position of the tactile feedback device on the device display to customize the device display.

13. A non-transitory computer-readable storage medium having computer-executable instructions stored thereupon which, when executed by a computer, cause the computer to:
- configure a device display in a first position on a touchscreen interface, the device display on the touchscreen interface independent of any tactile feedback device such that the device display does not correspond to any tactile feedback device, wherein the device display comprises a virtual control configured to receive input from a user via contact with the virtual control in a predefined manner such that the device display is configured in a first display configuration with the virtual control located at a first virtual control position on the device display;
- determine a position of a tactile feedback device removably coupled to the touchscreen interface;
- relocate the device display on the touchscreen interface from the first position to a second position, the second position being according to the position of the tactile feedback device on a surface of the touchscreen interface such that the virtual control substantially aligns with the tactile feedback device while maintaining the first display configuration;
- receive a user input to the virtual control via the tactile feedback device; and
- provide a response to the user input,
- wherein the tactile feedback device comprises a tactile reference that substantially frames the virtual control and that guides user input on the tactile reference to the virtual control on the touchscreen interface such that the user input is provided via the virtual control in the predefined manner.

14. The non-transitory computer-readable storage medium of claim 13,
- wherein causing the computer to determine the position of the tactile feedback device on the surface of the touchscreen interface comprises causing the computer to detect an identifier of the tactile feedback device, and
- wherein causing the computer to relocate the virtual control within the device display in response to the position of the tactile feedback device comprises causing the computer to reposition the virtual control at the position corresponding to the tactile feedback device as indicated by the identifier.

15. The non-transitory computer-readable storage medium of claim 14, causing the computer to configure a user input area of the virtual control according to the position of the tactile feedback device.

16. A computer-implemented method for providing tactile feedback to a user of a touchscreen interface, the method comprising:
- displaying a device display having a plurality of virtual controls on the touchscreen interface, a first virtual control of the plurality of virtual controls positioned at a first position on the touchscreen interface and configured to receive input from a user via contact with the first virtual control and provide the input to a device associated with the device display in a predefined manner such that the device display is configured in a first display configuration with the virtual control located at a first virtual control position on the device display;
- detecting a placement of a tactile feedback device corresponding to the first virtual control at a second position on the touchscreen interface;
- relocating the first virtual control from the first position to the second position associated with the tactile feedback device such that the device display comprises a second display configuration with the virtual control located at the second position on the device display;
- receiving input at the first virtual control from the user via contact in the predefined manner at the second position; and
- providing a response to the input from the user.

* * * * *